Aug. 7, 1934.   W. H. GUENTHER   1,969,555
ELECTRIC COOKING RANGE
Filed May 18, 1932

INVENTOR
William H. Guenther
BY
Swan, Frye, & Hardesty
ATTORNEY

Patented Aug. 7, 1934

1,969,555

UNITED STATES PATENT OFFICE 1,969,555

ELECTRIC COOKING RANGE

William H. Guenther, Detroit, Mich., assignor to Detroit Michigan Stove Company, Detroit, Mich., a corporation of Michigan Application May 18, 1932, Serial No. 612,134

2 Claims. (Cl. 219—35)

This invention relates to electric ranges for cooking and more especially to oven construction therefor.

In electric ovens for cooking purposes it has been customary on account of the relatively high cost of the heating medium to thoroughly insulate the oven so as to conserve the heat and thereby effect economy in the heating medium. In such ovens in order to permit escape of steam it has been usual to provide a small vent which the operator is supposed to open and close in accordance with conditions. With the vent open the escape of heated air and gases, as the oven is heating up, greatly prolongs this pre-heating up period and consequently increases the cost of operation. With the vent closed the warming up period is shortened somewhat but because steam generated from the food is maintained in the oven, products being cooked therein are likely to be moist and unpalatable.

Among the objects of the present invention is to eliminate the hand operated vent and obtain the effect, insofar as the warming up period is concerned, of a closed oven but yet provide for escape of steam, etc.

Another object of the invention is to provide a ventilating means which shall be entirely automatic in its action to accomplish the results indicated.

Still further objects will readily occur to those skilled in the art upon reference to the following description and the accompanying drawing in which Figure 1 is a conventional perspective illustration of an electric range.

Figure 1:
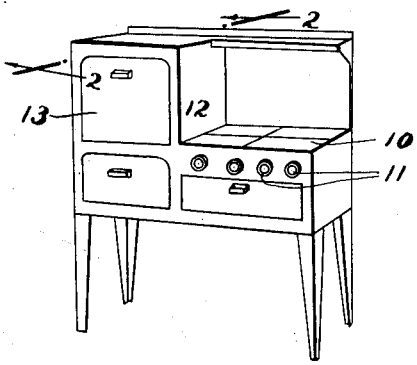

The range shown in the drawing comprises the usual cooking top 10 having the switch controls, some of which control the cooking top elements while one or more of the others control the oven heating elements. As is customary, at one side of the cooking top is provided an oven 12 having the usual door 13. In the present invention the oven, insofar as its general construction is concerned, may be conventional and may consist of the usual door 13 and the heat insulated top and side walls 14 within an upper and lower heating unit 15 and 16 respectively. These heating units may be of any suitable type and may be supplied with current in any suitable fashion, the leads thereto not being shown as they have no particular significance with respect to the present invention.

These ovens when properly made are substantially gas tight in order not to have air circulation through them. However, there are always some leaks and in the present case openings in the bottom may intentionally be provided.

Figure 3:
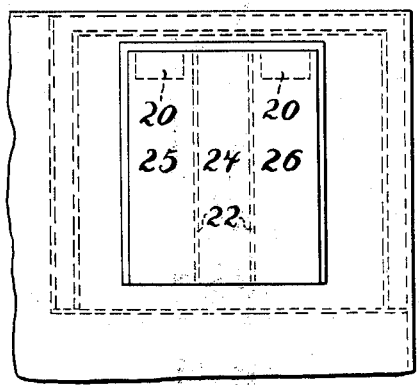
Figure 3 is a rear view of the oven portion of the range.

As indicated the rear wall 18 may also be heat insulated but for the purpose of the present invention is provided near its top with one or more openings 20. In the form shown there are two of such openings which are relatively close together one on each side of the central space as indicated best in Fig. 3. Over the openings is secured a shield or conduit member 21 which is provided with two partitions 22 dividing the space within the conduit into three vertically extending portions 24, 25 and 26, which are all open at the bottom as at 23. The central one 24 of the several conduits may be used for the passage of the current leads to the upper and lower units 15 and 16 while the two side conduits 25 and 26 communicate with openings 20 and provide for escape of air and gases from the oven.

Figure 2:
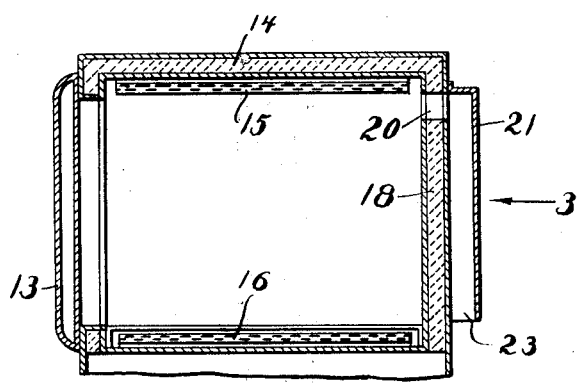
Figure 2 is a section on the line 2—2 of Figure 1.

The lower ends of the conduits are slightly above the level of the lower heating unit as indicated in Figure 2 so that cool air leaking into the oven and coming up thru the lower wall thereof will, upon being heated pass thru the end 23 rather than be forced back thru the said lower wall. Therefore, the lower the ends of conduits 25 and 26 the longer the time before gases begin to pass out. This action will be facilitated somewhat by a syphoning action due to radiation thru the conduit walls. Such radiation will result in cooling the gases and therefore increasing their weight.

The location of the open lower end of the conduit therefore furnishes a means for adjusting the time required in the preheating period. If the open end of the conduit is quite well up the oven wall the escape of heated gases will be facilitated and the preheating time correspondingly lengthened. If it is well down toward the level of the bottom of the oven the gases will be held in the oven and the heating time correspondingly shortened. The open end should, however, not be so low as to cause the gases to escape thru other incidental openings rather than thru these conduits.

Now having described the invention and the preferred embodiment thereof, it is to be understood that the said invention is to be limited, not to the specific details herein set forth, but only by the scope of the claims which follow:

What I claim is:

1. In a range oven having filled walls defining a substantially gas tight enclosure, and having electric heating means, venting means comprising an opening through and near the top of a wall of said oven and a duct structure carried by and projecting from said wall and covering said opening and extending downwardly therefrom to a point of discharge outside of the oven slightly above the bottom wall.

2. In a range oven having heat insulated walls, and being electrically heated, the oven also having an aperture through its rear wall near the top and means for conducting gases from the top portion of said oven and discharging them outside at a lower level, said means comprising a duct-forming structure carried by and projecting from the rear wall of the oven, covering said aperture but otherwise closed at its top and open at its bottom slightly above the bottom of the oven.

WILLIAM H. GUENTHER.